W. D. WESTMAN.
SCROLL-SAW.
No. 178,821. Patented June 13, 1876.
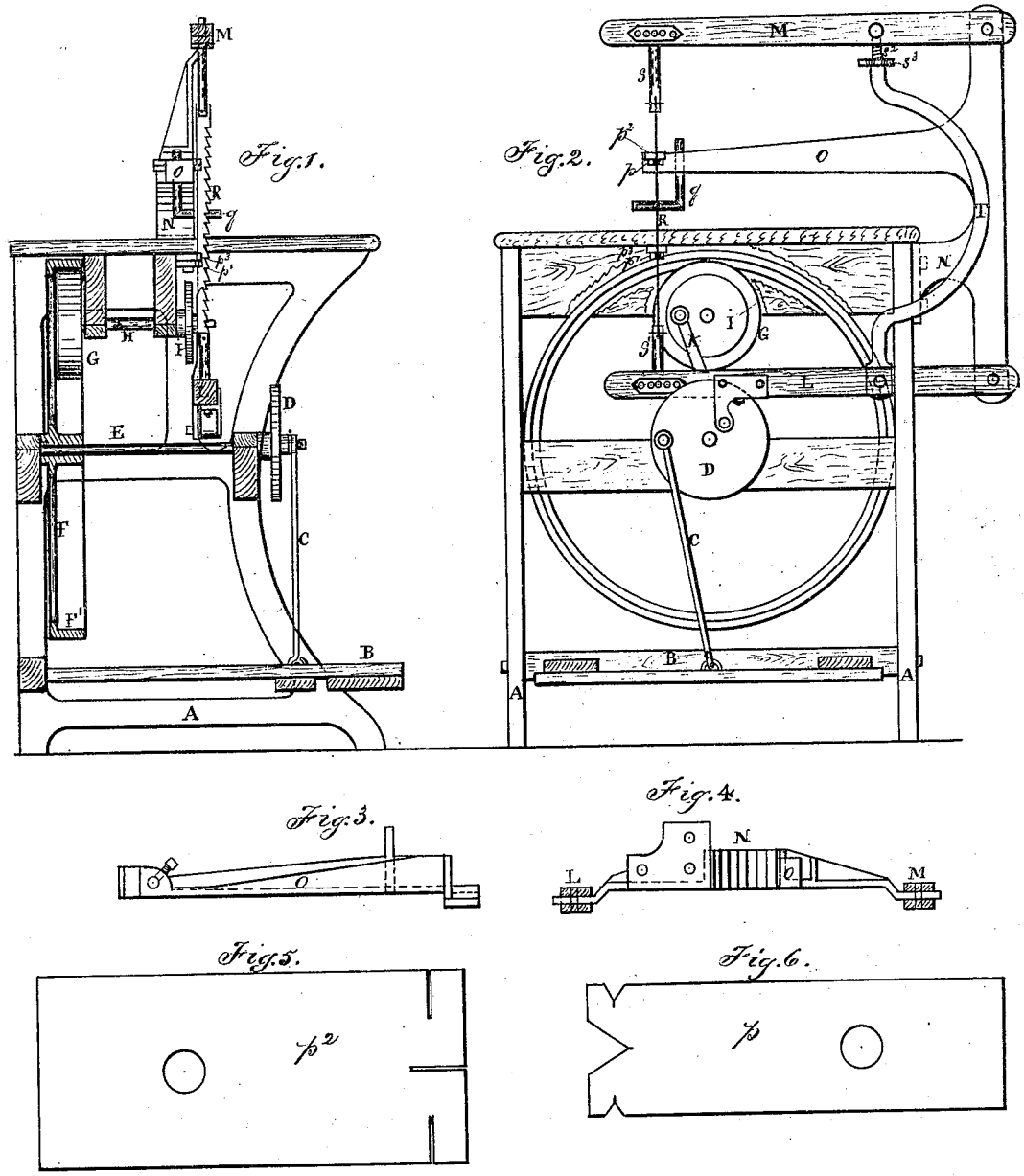

UNITED STATES PATENT OFFICE.

WILLIAM D. WESTMAN, OF TORONTO, CANADA.

IMPROVEMENT IN SCROLL-SAWS.

Specification forming part of Letters Patent No. 178,821, dated June 13, 1876; application filed June 23, 1875.

*To all whom it may concern:*

Be it known that I, WILLIAM DOUGLAS WESTMAN, of the city of Toronto, in the county of York, in the Province of Ontario, Canada, machinist, have invented certain new and useful Improvements on Scroll-Saws; and I do hereby declare that the following is a full, clear, and exact description thereof, whereby others skilled in the art might make and use the same, reference being had to the drawings, and to this specification.

My invention relates to those saws used by carpenters, cabinet-makers, and others for cutting out scroll and circular pieces of wood, such as are used in house-fittings and furniture, but is also suitable for pattern-makers for cutting out the circular pieces used by them in the building of wheels and pulleys, and is suitable for the cutting out of every description of circular and scroll work.

Although it in reality is a scroll-cutting saw, it is, by certain appliances in its construction, also suitable for ripping purposes, and is, therefore, a scroll and rip saw. It is constructed so that it can be driven by any ordinary motive power, but is well adapted for being driven by the foot by means of a treadle and rod pivoted on a face-plate, which I shall now more particularly describe along with the other parts of the machine. It consists, in the first place, of the aforesaid treadle and rod pivoted on a face-plate on the end of the main shaft, upon which shaft, and close to the opposite end thereof, is fastened the large wheel, which acts as a balance or fly wheel in carrying the crank-pin in the face-plate over the centers, and producing, thereby, a continuous motion. This balance-wheel aforesaid is turned, inside of its rim, flat and smooth for about two inches in width, or as much more as may be necessary. The rim of this wheel is twenty-eight inches diameter, but is not limited to any particular size. Inside of the turned rim aforesaid is a pulley of about eight inches in diameter, having its outer rim in contact with the inside rim of the wheel. In giving motion to this wheel by means of the treadle and other mechanism aforesaid, in connection therewith, the pulley will also be put in motion from its being in contact with the rim of the large wheel. On the opposite end of this pulley-shaft is another face-plate, having, also, a crank-pin, to which one end of a pitman is attached, and the other end thereof to the lower saw-beam, which is pivoted, at its outer end, to a bracket, which forms a part of the machine, upon which bracket, at its extreme top end, is also pivoted the upper saw-beam. These beams embrace the top and bottom of the saw by means of suitable buckles pivoted at the inner end of the beams aforesaid. These pivoted beams are tightened by means of a bent tightening bar and screw, and receive a vibrating motion from the pitman aforesaid. The machine is now complete and ready for operation.

In the accompanying drawings the same letters of reference indicate the same parts, and in this specification Figure 1 is a side view, in which A is the frame, the front part of which is supposed to be removed in order to show the various portions of the machinery; B, the treadle, which is operated by the foot, and gives motion to all the moving parts of the machine; C, the treadle-rod, which communicates motion from the treadle B; D, a face-plate with crank-pin, on which the rod C is pivoted; E, the first motion shaft, having its journals adjustable by spring-packing of rubber, to regulate the friction; F, the large wheel, which carries the crank-pin in face-plate D over the centers, and produces continuous motion, and, by means of its internal friction-rim F', rotates the pulley G on shaft H. I is a face-plate, having, also, a crank-pin, on which is pivoted the pitman K, which pitman is pivoted to the lower saw-beam L, and gives motion to the saw R; N, a bracket, to which the saw-beams L and M are pivoted, and having, also, the arm O, in which is secured the steel guide $p$ and wooden guide $p^2$; also, the adjustable guide $q$, for keeping the stuff operated on down to the table. $p\ p^1$ are two steel guides, in which the back of the saw is pressed when in operation. $p^2\ p^3$ are two wooden guides for preventing lateral motion of the saw when in operation; S, the upper saw-buckle; S$^1$, the lower saw-buckle. These buckles and the steel guides $p\ p^1$ and wooden guides $p^2\ p^3$ are adjustable for three different positions of the saw, by having two holes in each buckle at right angles, and three holes for the same in the top and lower beams. These various positions are more particularly required for reversing the saw, so as as to keep the stuff operated on clear of the bracket N. T, a tightening-bar, bent in the middle, so as to be clear of the stuff when being operated on, and, being placed at the side instead of at the back of the table, makes full provision for using the saw as a rip-saw. The bar T is pivoted in the lower saw-beam L, and adjusted by means of a pivoted screw, $S^2$, and finger-nut $S^3$ in the upper saw-beam M, by means of which the saw R is readily and satisfactorily tightened up. R, the saw, which is shown to be tapered for the purpose of clearing itself, and to allow the stuff to be more easily fed into it without crowding the saw in its upward stroke.

I make the taper of the saw in all cases in proportion to the thickness of the stuff to be cut thereby.

Fig. 2 is a front view, showing all the parts specified in Fig. 1, and having portions of the cross-bars $t$ $t$ removed, in order to show the friction-rim F and friction-pulley G in contact, and supposed to be adjusted for operation.

The pulley G may be placed at any suitable point in the circumference of the wheel F, and on the outside of the rim F', which latter position I do not claim, as I am aware it has been used previously for a similar purpose, but under a different arrangement.

Fig. 3 is a plan of bracket N, with arm O. Fig. 4 is a front view of the same. Fig. 5 is a plan of steel guide $p$. Fig. 6 is a plan of wooden guide $p^2$.

Having thus described my invention, I claim as new and desire to secure by Letters Patent—

1. The saw R, tapered, and in combination with the steel guides $p$ $p^1$ and wooden guides $p^2$ $p^3$, as and for the purposes set forth.

2. The buckles S $S^1$, in combination with the steel guides $p$ $p^1$, wooden guides $p^2$ $p^3$, adjustable for three positions of the saw, as shown and described.

3. In a rip and scroll saw, constructed with steel guides $p$ $p^1$, wooden guides $p^2$ $p^3$, buckles S $S^1$, for three positions of the saw, saw-shaft H, pitman K, treadle B, rod C, and axle E, the combination of a main driving-wheel, F, hung upon the saw-shaft pulley G, as shown and described, and for the purposes set forth.

WILLIAM DOUGLAS WESTMAN.

Witnesses:
WILLIAM GILL,
CHAS. SMITH.